United States Patent [19]

Wakatsuki et al.

[11] Patent Number: 5,031,091
[45] Date of Patent: Jul. 9, 1991

[54] CHANNEL CONTROL SYSTEM HAVING DEVICE CONTROL BLOCK AND CORRESPONDING DEVICE CONTROL WORD WITH CHANNEL COMMAND PART AND I/O COMMAND PART

[75] Inventors: Kazuyoshi Wakatsuki, Kamakura; Yukihiro Yoshiya, Yamato; Yukio Kameda, Zama, all of Japan

[73] Assignee: PFU Limited, Kahoku, Japan

[21] Appl. No.: 433,435

[22] Filed: Nov. 8, 1989

Related U.S. Application Data

[63] Continuation of Ser. No. 78,886, Jul. 29, 1987, abandoned.

[30] Foreign Application Priority Data

Jul. 31, 1986 [JP] Japan .................................. 61-180808

[51] Int. Cl.⁵ .................... G06F 13/10; G06F 11/30
[52] U.S. Cl. ............................... 364/200; 364/265.5; 364/238.3; 364/260.1; 364/263
[58] Field of Search ... 364/200 MS File, 900 MS File

[56] References Cited

U.S. PATENT DOCUMENTS

| | | | |
|---|---|---|---|
| 3,728,693 | 4/1973 | Macker et al. | 364/200 |
| 3,898,623 | 8/1975 | Cormier | 364/200 |
| 4,053,950 | 11/1977 | Bourke et al. | 364/200 |
| 4,495,564 | 1/1985 | Draper et al. | 364/200 |
| 4,549,263 | 10/1985 | Calder | 364/200 |
| 4,604,709 | 8/1986 | Blount et al. | 364/900 |
| 4,750,107 | 6/1988 | Ruggert | 364/200 |
| 4,754,399 | 6/1988 | Yamamoto et al. | 364/200 |
| 4,901,232 | 2/1990 | Harrington et al. | 364/200 |

*Primary Examiner*—Thomas C. Lee
*Attorney, Agent, or Firm*—Staas & Halsey

[57] ABSTRACT

A device control word including a channel command part and an I/O command part is prepared in a main storage unit, and sent to a channel unit together. The channel command part has a common format for different types of I/O devices or I/O controllers thereof, while the I/O command part may have a different format for each type of the I/O devices. Thereby, the same channel unit can be used for or connected to different kinds of I/O controllers by simply modifying software in a central processing unit to correspond to respective I/O controllers.

6 Claims, 7 Drawing Sheets

| BIT<br>BYTE | 7 | 6 | 5 | 4 | 3 | 2 | 1 | 0 |
|---|---|---|---|---|---|---|---|---|
| 0 | \multicolumn{8}{c}{COMMAND CODE} |
| 1 | \multicolumn{3}{c}{I/0 NUMBER} | \multicolumn{5}{c}{0 ———— 0} |
| 2 | \multicolumn{8}{c}{BYTE LENGTH OR NUMBER OF BLOCKS} |
| 3 | \multicolumn{8}{c}{.} |
| 4 | \multicolumn{8}{c}{.} |
| 5 | \multicolumn{7}{c}{0 ———————— 0} | LINK |

FIG. 7

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | BSY | CE | DEE | UUC | UE | PCI | IL | PC | OPC | CDC | CCC | 0 | 0 |

| BIT<br>BYTE | 7 | 6 | 5 | 4 | 3 | 2 | 1 | 0 |
|---|---|---|---|---|---|---|---|---|
| 0 | | SENSE BYTE FORMAT | | | ERROR CODE | | | |
| 1 | | | | | | | | |
| 2 | FILE MARK | EDM | ILI | "0" | SENSE KEY | | | |
| 3 | | | | | | | | |
| 4 | | | | | | | | |
| 5 | | | | | | | | |
| 6 | | | | | | | | |
| 7 | LENGTH ($l$) OF ADDITIONAL SENSE BYTE | | | | | | | |
| 8 | INDIVIDUAUL SENSE BYTE | | | | | | | |
| ⁞ | " | | | | | | | |
| $l$+7 | " | | | | | | | |

CHANNEL CONTROL SYSTEM HAVING DEVICE CONTROL BLOCK AND CORRESPONDING DEVICE CONTROL WORD WITH CHANNEL COMMAND PART AND I/O COMMAND PART

This is a continuation of copending application Ser. No. 07/078,886 filed on July 29, 1987 now abandoned.

BACKGROUND OF THE INVENTION

1. Field of the Invention

The present invention is related to a channel unit control system in a data processing system and, more particularly, to a channel control system that is connectable to any intelligent I/O controller with changes only in software.

2. Description of the Related Art

A data processing system usually consists of a central processing unit (CPU), a main storage unit, one or more channel units, I/O (input/output) devices and I/O controllers provided between the channel units and the I/O devices.

Conventional channel units are roughly classified into two types. The first type is for relatively low intelligence and low speed devices in which the channel unit itself interprets I/O commands. The I/O commands are issued by software in the CPU to designate a specific I/O device to do a specific operation and directly controls the I/O device. Therefore, the structure and/or control program of a first type channel unit is specialized for a specific I/O device and cannot control other kinds of I/O devices. If a new I/O device, especially one with higher or enhanced intelligence, is added to the data processing system, a new channel unit must be developed. In addition, new software which utilizes the newly defined I/O commands must be developed, too.

The second type of channel unit is for relatively high intelligence I/O devices and operates with the aid of I/O controllers. A channel unit of the second type transfers an I/O command from software to the I/O controller as it is, without interpreting the contents thereof, and then the I/O controller interprets the transferred command and informs the channel unit of the necessity for a data transfer and the direction thereof. The second type of channel unit is more flexible than the first type and can handle greater varieties of I/O devices and I/O controllers, because the channel unit itself does not use the contents of I/O commands and leaves precise control of the I/O device to the I/O controller.

The second type, however, still has a disadvantage in that each channel unit is, in reality, limited in what kind of I/O device can be connected thereto. For example, a channel unit for a sequential access device, i.e., magnetic tape unit, cannot be used for a direct access device, i.e., magnetic disk unit. This is because the I/O command format is different for each kind of I/O device and thus, each channel unit must be designed to be able to handle the specific command format. Thus, if a certain system having only a magnetic tape file unit is required to enhance its performance by introducing a magnetic disk file unit, a new channel unit also must be introduced or newly developed.

As an alternative, a channel unit may be designed to handle multiple command formats, but will require a large amount of hardware at considerable cost and additional information will be required to identify the command format of the I/O command.

Furthermore, the second type of channel unit has another problem in that the data transfer can be prepared only after the controller informs the channel unit of necessary information, and therefore the data transfer speed is limited.

SUMMARY OF THE INVENTION

An object of the present invention is to provide a general-purpose channel unit which, without changing any function thereof, can be connected to various types of I/O devices or I/O controllers thereof.

Another object of the present invention is to provide a general-purpose channel unit which can control I/O devices or I/O controllers without conscious of the contents of I/O commands.

Yet another object of the present invention is to provide a general-purpose channel unit which can be informed of information, which is necessary to carry out the operation of the I/O command, independently from the I/O command itself.

Still another object of the present invention is to provide a general-purpose channel unit which can perform data transfer in high speed.

To achieve the foregoing and other objects of the present invention and in accordance with the purpose of the invention, there is provided a general-purpose channel control system in which a channel command of a format being common to different types of I/O devices is sent to the channel unit together with the I/O command whose format may be different depending on the type of the I/O device.

DESCRIPTION OF THE PREFERRED EMBODIMENT

Figure 1:
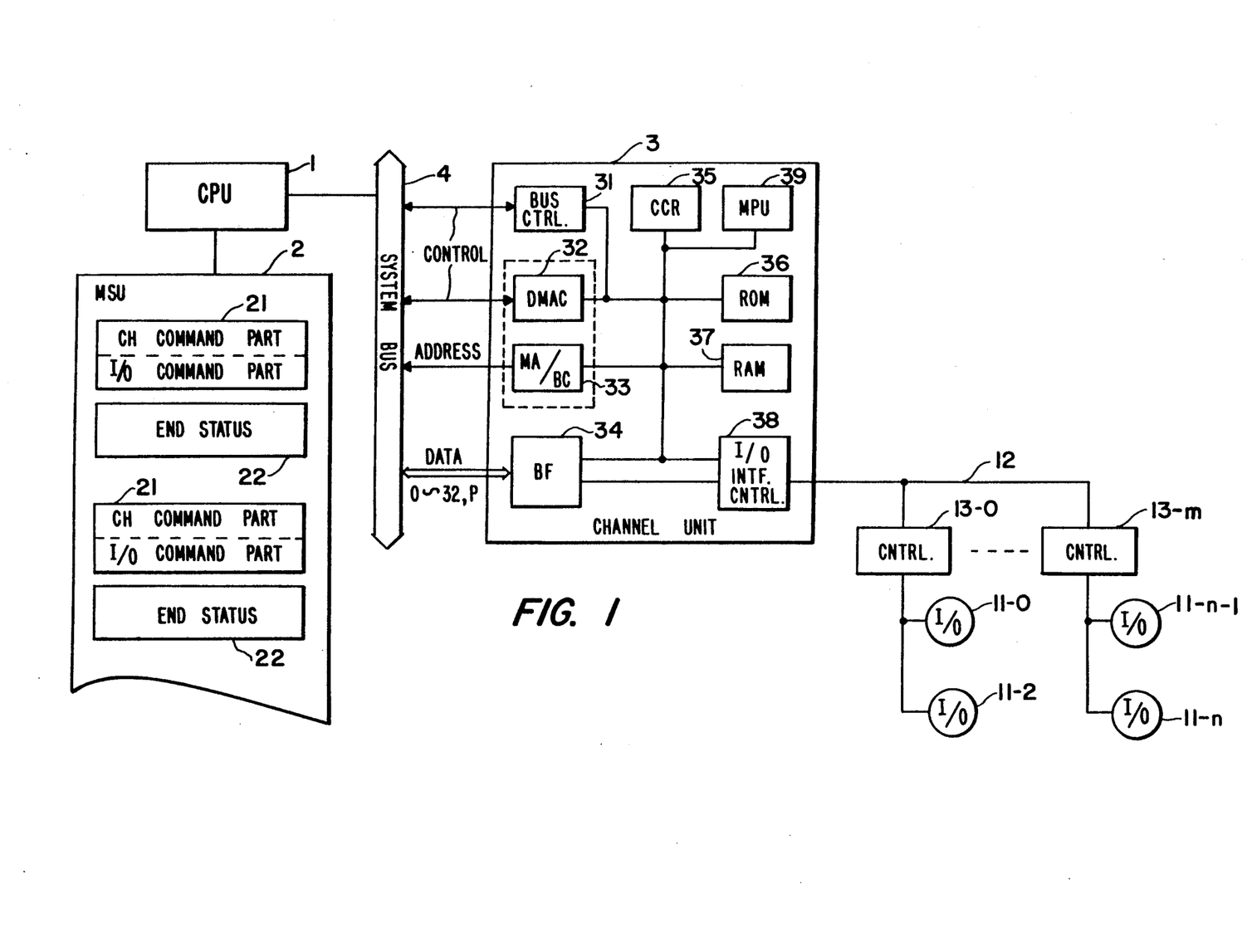
FIG. 1 is a schematic block diagram of the data processing system where the present invention is applied.

FIG. 1 illustrates a system configuration of the present invention including: a central processing unit or CPU 1; a main storage unit (MSU) 2; channel unit 3; a general-purpose interface 12, such as an RS232C or IEEE 488 link, etc.; I/O controllers 13-0 to 13-m; and I/O devices 11-0 to 11-n. Each controller can be connected with a plurality of I/O devices. In MSU 2, there are provided command regions 21 for channel and I/O commands and status regions 22 for various status information.

The channel unit 3 includes: a bus controller 31 for controlling the system bus 4 between the CPU 1 and the channel unit 3; a direct memory access controller (DMAC) 32; a memory address register (MA) and a byte count register (BC) 33; a data buffer (BF) 34; channel control registers (CCR) 35 for storing various control data; a read only memory (ROM) 36 for storing a microprogram for MPU 39; a random access memory (RAM) 37 for storing various data temporarily; I/O interface controller 38 for controlling the general purpose I/O interface 12; and microprocessor unit (MPU) 39 for controlling all these elements inside the channel unit 3.

Figure 2:
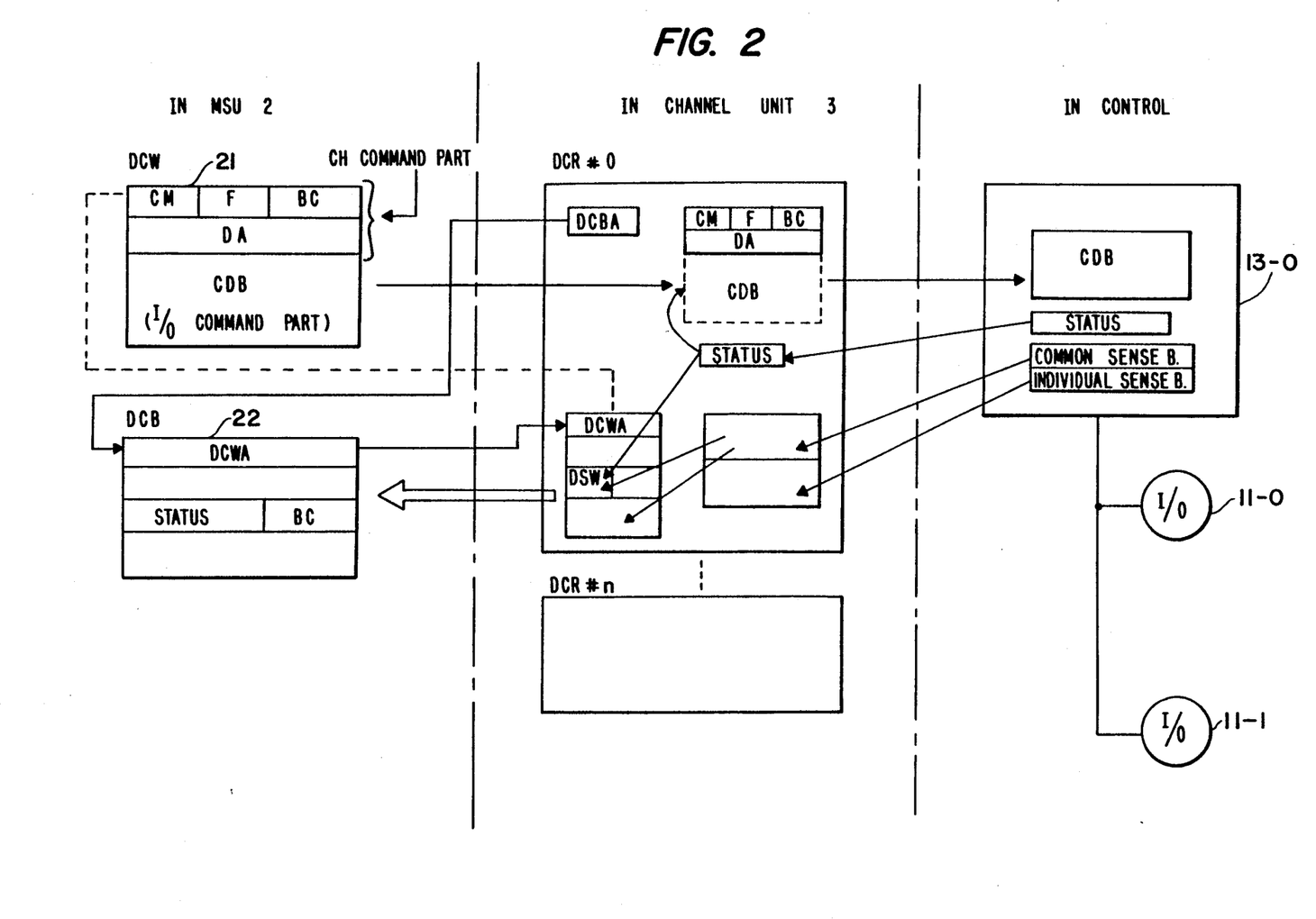
FIG. 2 is an explanatory diagram of flows of commands and status information in the present invention.

FIG. 2 illustrates flows of commands and other data for I/O operations. In the command region 21 of MSU 2, a device control word (DCW) is provided and the contents thereof is prepared by software when the I/O operation is required. The DCW in the present invention, includes a channel command part and an I/O command part. The channel command part includes a command code CM, flags F, a byte count BC, and a data address DA. Examples of possible channel command codes CM are given below.

| Code in hexadecimal | Command name | Data transfer |
| --- | --- | --- |
| 00 | (none) | (none) |
| 01 | WRITE | MSU→ I/O |
| 02 | READ | I/O→MSU |
| . | . | . |
| . | . | . |
| . | . | . |
| 13 | CONTROL | (none) |

Figure 3:
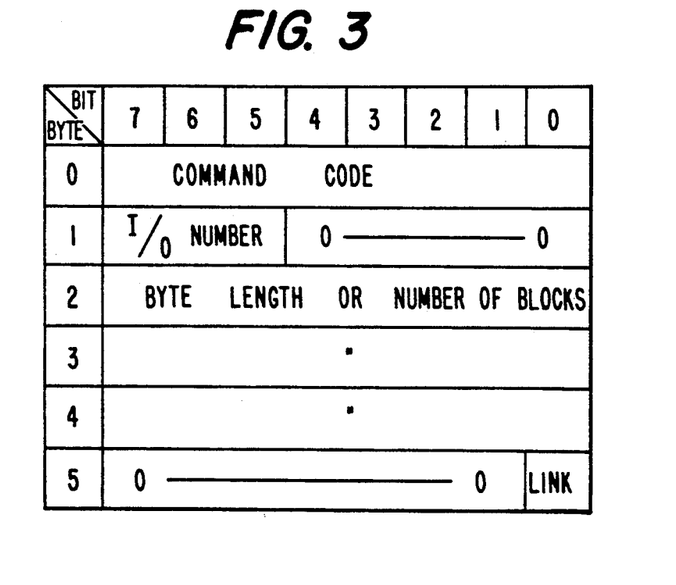
FIG. 3 is an exemplary format of an I/O command in the present invention.

The format of the I/O command part, which is also called a command description block (CDB), can be freely designed and may include an I/O device number, an I/O command code, and other information similar to the channel command part. An example of a CDB is shown in FIG. 3. The I/O command in FIG. 3 is for a sequential file device, such as a magnetic tape unit, and consists of six bytes. The I/O command code is in byte 0; the I/O device number is in byte 1; the data transfer byte length or number of data blocks to be transferred is in bytes 2 to 4; and a link flag which designates a successive execution of the next I/O command without releasing the I/O interface 12, is in byte 5.

In the status regions 22 of the MSU 2, a device control block (DCB), a DCW address (DCWA), a remaining byte count, and other status data are provided. A DCB is usually provided for every I/O device to indicate the status thereof. A plurality of DCWs are also provided for allowing simultaneous I/O operations of several I/O devices.

In the channel unit 3, a plurality of device control registers (DCR #0-#n) are provided in RAM 37, one for every I/O device connected to the channel unit 3. Each DCR includes a region for a DCB address (DCBA), a region for a DCW, a region for common/individual sense bytes, a region for status information and a region for a DCW address (DCWA).

For an I/O operation, the software in CPU 1 prepares the necessary information in the DCW, sets the DCWA thereof in the DCB corresponding to the I/O device to be used, I/O device 11-0, for example, and then transfers the DCBA thereof to the channel unit 3 along with the I/O device address. The DCBA is held in the DCR #0 corresponding to the device address. Then a start DCR command (SDCR) is issued. The channel unit 3 reads out the DCWA from the MSU 2 according to the DCBA. The channel unit 3 further reads out the DCW from the MSU 2 according to the DCWA, and transfers the CDB part thereof to the controller 13-0. At the same time, the channel unit 3 interprets the channel command part, and prepares for a data transfer, if necessary.

The controller 13-0 receives and interprets the I/O command, and controls the I/O device 11-0. The data transfer, if required, is carried out between the channel unit 3 and the controller 13-0, while the data transfer between the channel unit 3 and MSU 2 is also carried out on a DMA basis at the same time.

Upon completion of the data transfer, if an abnormal end occurs, the controller 13-0 sends the common and individual sense bytes to the channel unit 3. The channel unit receives and holds both sense bytes and produces a channel end status and an I/O end status both from the common sense byte. These statuses are formed as an updated DCB and transferred to the status region 22 in the MSU 2. The CPU 1 also can read out the individual sense byte from the DCR#0 in the channel unit 3 by a sense command.

Figure 4:
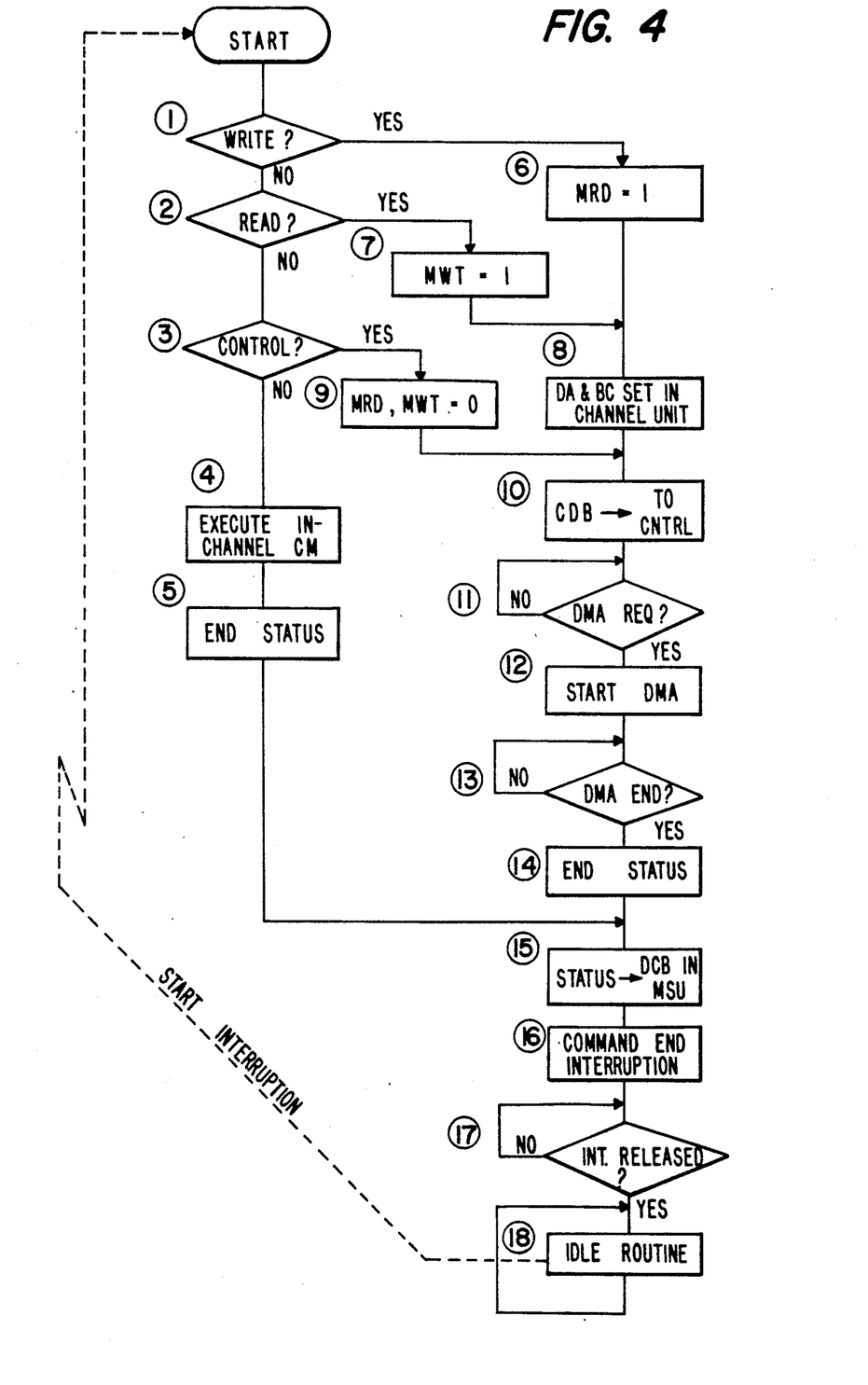
FIG. 4 is a flowchart of the channel operation in the present invention.

FIG. 4 shows a flowchart of a part of the microprogram in the channel unit 3, which includes steps of:

①  Check the command code CM, and if it is the WRITE command, go to ⑥, otherwise go to ②;
②  Check the command code CM, and if it is the READ command, go to ⑦, otherwise go to ③;
③  Check the command code CM, and if it is the CONTROL command, go to ⑨, otherwise go to ④;
④  Execute the in-channel command;
⑤  Produce the end status;
⑥  Set a memory read flag (MRD) to "1". The MRD flag is in the DMAC 32;
⑦  Set a memory write flag (MWT) to "1". The MWT flag is also in the DMAC 32;
⑧  Set the data address and the byte count in the MA and BC registers 33;
⑨  Set both the MRD and MWT flags to "0";
⑩  Transfer the CDB part to the controller corresponding to the DCBA;
⑪  Wait for a data transfer request from the controller. Upon reception of the request, go to ⑫;
⑫  Start the DMA data transfer;
⑬  Detect the end of the DMA data transfer. Upon detection of the end of the DMA, go to ⑭;
⑭  Produce the end status in the DCR;
⑮  Transfer the status data in the DCR to the DCB in the MSU;
⑯  Make a command end interruption to the CPU;
⑰  Wait for release of the interruption. Upon release, go to ⑱;
⑱  Idle routine for waiting for the SDCR command;

Detailed operation of these steps are readily understood by ordinary skilled persons in this field, and therefore no further detail is explained.

According to the present invention, the channel unit 3 can prepare for data transfer (steps of ⑥, ⑦ and ⑧) in advance to receiving a data transfer request from the controller. This is because the channel command part is provide and defined separately and independently from attributes of the controllers of I/O devices.

Furthermore, upon modification or replacement of the controllers for providing new functions or new commands, the channel unit 3 itself does not require any modification, because the channel unit 3 operates only according to the channel command part which is common to any kind of I/O device or controller therefor.

The software in CPU 1 must be modified for handling the newly defined functions or I/O commands, but does not require any change for handling the channel unit 3. In a system using a conventional channel unit, the software must be modified also for handling the new channel unit.

Figure 5:
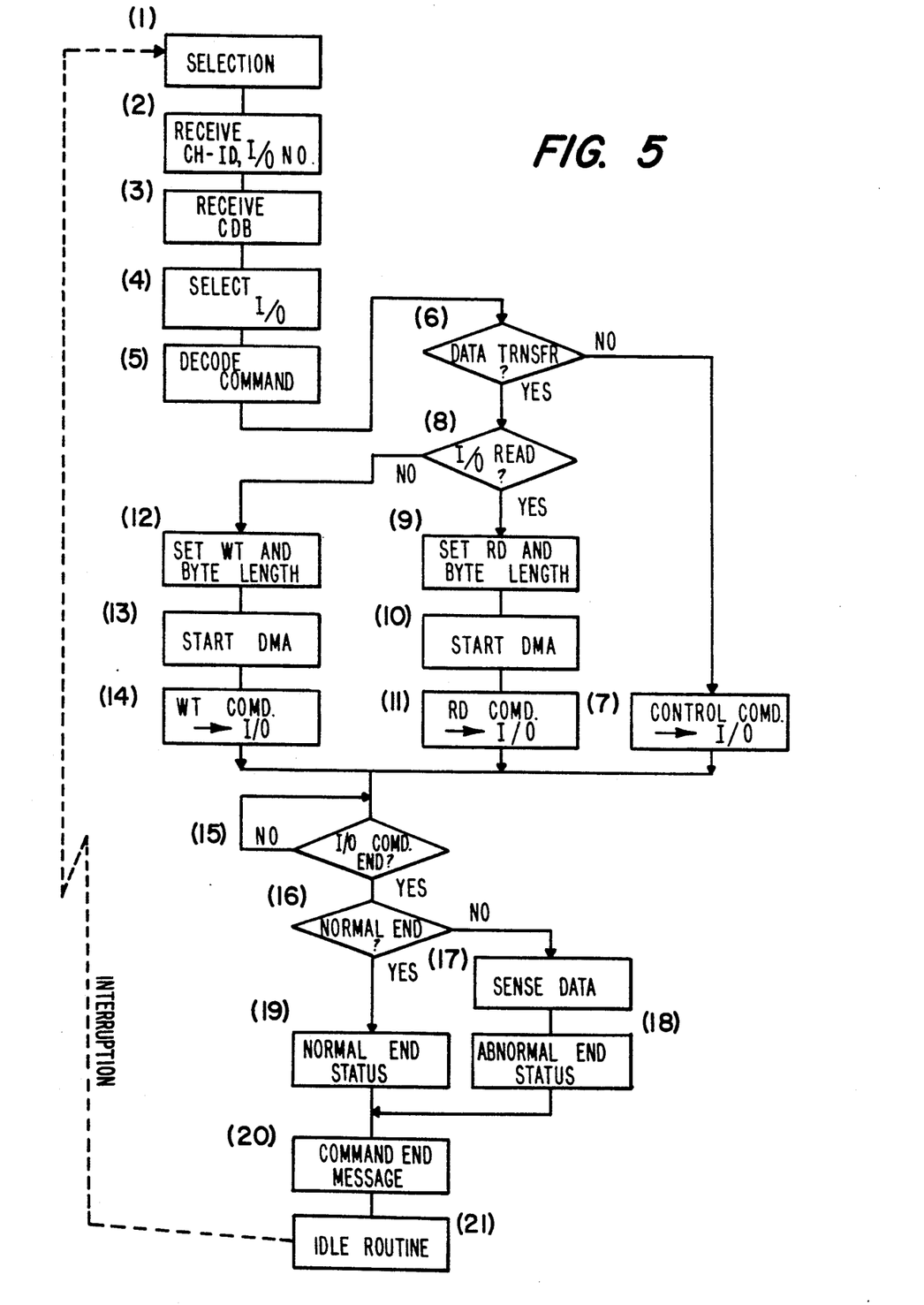
FIG. 5 is a flowchart of the controller operation in the present invention.

FIG. 5 shows a flow chart of the process in a controller, e.g., controller 13-0. The flow chart includes the following steps:

(1) The controller, e.g., 13-0, is selected by the channel unit 3 in accordance with the I/O number in the CPU software that is sent to the channel unit 3;

(2) A channel ID and the I/O number are sent from the channel unit 3 to the controller 13-0;

(3) The I/O command (CDB) is transferred to the controller 13-0;

(4) The I/O device, e.g., 11-0, is selected by the controller 13-0;

(5) The I/O command is decoded;

(6) If no data transfer is required, go to (7), otherwise go to (8);

(7) A control command is sent to the I/O device;

(8) If a read operation is required, go to (9), otherwise go to (12);

(9) The transfer byte length and a READ control signal are set;

(10) The DMA operation is started;

(11) The READ command is sent to the I/O device 11-0;

(12) The transfer byte length and a WRITE control signal are set;

(13) The DMA operation is started;

(14) The WRITE command is sent to the I/O device 11-0;

(15) Check if the I/O command is completed;

(16) Check if the operation is completed normally or not;

(17) Produce the sense data;

(18) Produce the abnormal end status;

(19) Produce the normal end status;

(20) Send the command end message to the channel unit 3;

(21) Wait for an interruption.

Figure 6:
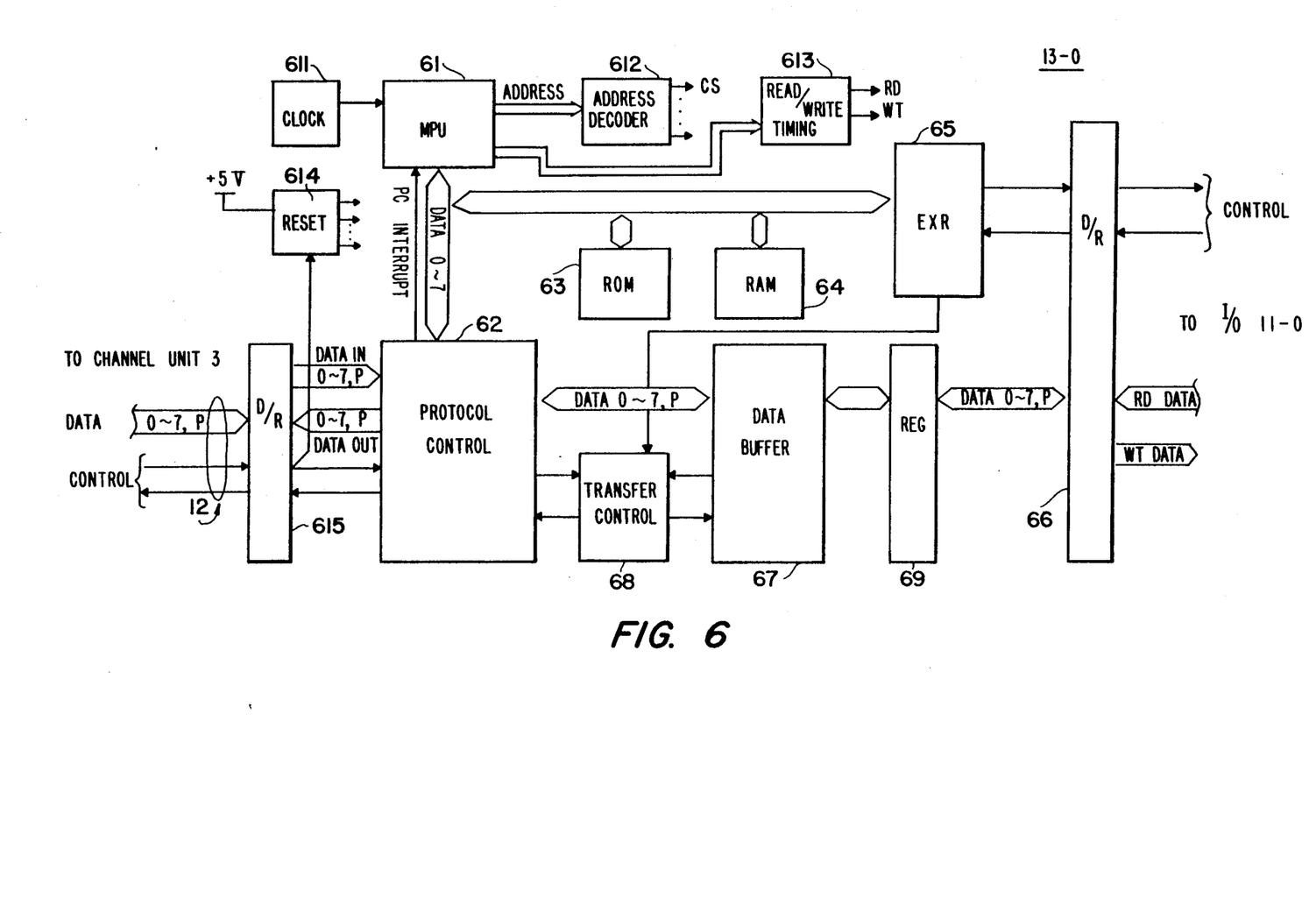
FIG. 6 is a block diagram of an I/O controller in the present invention.

FIG. 6 is a block diagram of a controller, e.g., 13-0, in which: 61 is a microprocessor (MPU) for executing the flow chart in FIG. 5 and other operations in the controller; 62 is a protocol control circuit for controlling the interface between the controller, e.g., 13-0 and the channel unit 3; 63 is a read only memory (ROM) for storing microprogram for the MPU 61; 64 is a random access memory (RAM) for temporarily storing various data; 65 is a group of external registers for interfacing between MPU 61 and other external circuits; 66 is a set of drivers/receivers for the communication link between the controller and the I/O devices; 67 is a data buffer of 128 bytes; 68 is a transfer control circuit for controlling the timing and the direction of data transfer between the buffer 67 and the protocol control 62; 69 is a one byte buffer register; 611 is a clock generator; 612 is an address decoder for decoding the address signal from MPU 61 and provide chip select signals for ROM 63, RAM 64, the external registers 65 and the protocol control circuit 62; 613 is a read/write timing control circuit for read and write operations of MPU 61 from and to elements 62–65; 614 is a reset circuit to initialize the whole controller circuit at a power-on of the controller 13-0; and 615 is a set of drivers/receivers for the general purpose interface 12 between the controller 13-0 and the channel unit 3.

Note that the structure and/or microprogram of the controllers 13-0 to 13-m may differ from each other depending on the type of I/O devices 11-0 to 11-n connected thereto. Also, the end status is produced in the channel unit 3 from the common sense byte sent from the controller 13-0, for example, so that the status format can be common for any controllers and any software therefor.

Figure 7:
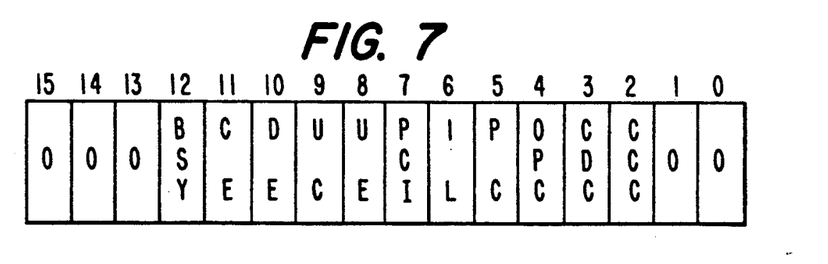
FIG. 7 is a format for an end status in the present invention.

FIG. 7 shows a bit configuration of the end status of a device status word or DSW which is produced in the DCR #0 in the channel unit 3. The meaning of each bit of the DSW is as follows.

| BITS (ABBREV.) | NAME | MEANING |
| --- | --- | --- |
| 15–13 | (not used) | always "0". |
| 12 (BSY) | busy | I/O device is in operation. |
| 11 (CE) | channel end | channel operation is completed. |
| 10 (DE) | device end | I/O device operation is completed. |
| 9 (UC) | unit check | an error is detected in I/O device. |
| 8 (UE) | unit exception | file mark or end of medium is detected (in case of a sequential file device). |
| 7 (PCI) | prgrm. cntl. interrupt | PCI flag in DCW in "1". |
| 6 (IL) | incorrect length | data length designated by BC in DCW is not equal to the data length in I/O device. |
| 5 (PC) | program check | a program error is detected. |
| 4 (OPC) | operator call | I/O device is not ready or not connected. |
| 3 (CDC) | channel data check | an error during data transfer. |
| 2 (CCC) | channel control check | an error during control data transfer. |
| 1–0 | (not used) | always "0". |

The bits 11(CE), 10(DE), 7(PCI), 3(CDC) and 2(CCC) are determined by the channel unit 3, while the bit 12(BSY) is derived from the status of the interface between the channel unit 3 and the controller 13-0, for example, and bits 9(UC), 8(UE), 6(IL), 5(PC) and 4(OPC) are derived from the common sense byte. If an I/O operation completes with a normal status, only the bits 11(CE) and 10(DE) are "1" and all other bits are "0". In case of an abnormal end, besides the bits 11 and 10, one of the bits 9(UC), 8(UE), 6(IL) and 4(OPC) will also be "1".

Figure 8:
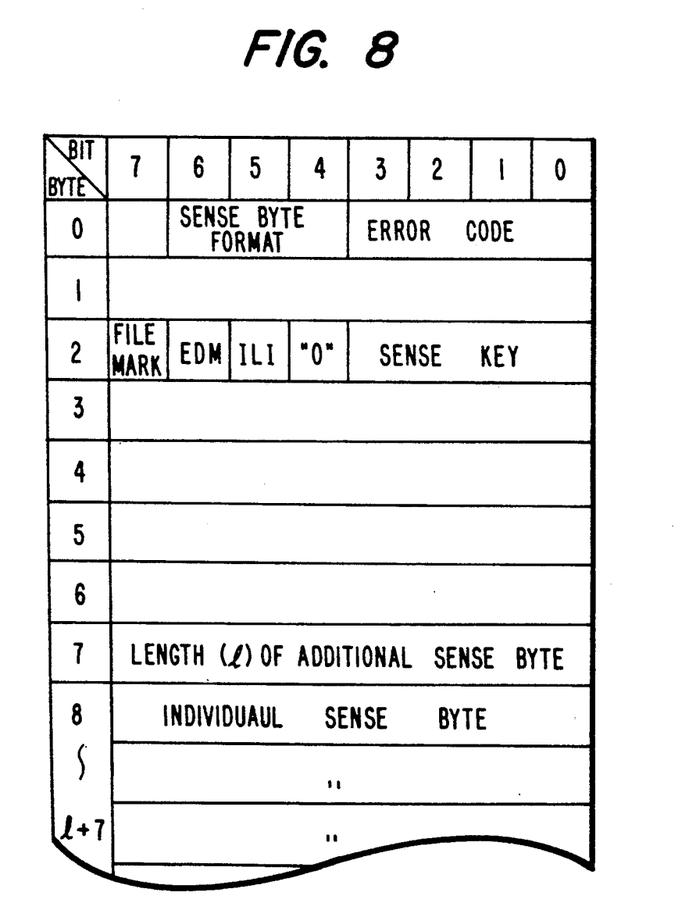
FIG. 8 is a format for a sense byte in the present invention.

An exemplary format of the common sense byte is shown in FIG. 8. The common sense byte actually consists of eight (8) bytes and is followed by individual sense bytes. Various status information of the I/O device is displayed in the third byte (byte 2). The unit exception bit (UC) in the DSW is determined by the file-mark bit and the end-of-medium (EOM) bit in the common sense byte. The incorrect length (IL) bit in the DSW is determined by the incorrect length indicator (ILI) bit in the common sense byte. The unit check (UC), program check (PC) and operator call (OPC) bits are determined by the value of a sense key, i.e., bits 3 to 0 of byte 2 of the common sense byte. The eighth byte (byte 7) of the common sense byte indicates the number of bytes in the following individual sense bytes. The number (l) of individual sense bytes is equal to the number of I/O devices connected to the controller being used.

The foregoing is considered illustrative only of the principle of the present invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims.

What is claimed is:

1. A data processing system, comprising:
   a central processing unit;
   a main storage unit, operatively connected to said central processing unit, for storing at least one device control word and at least one device control block, each device control word including a channel command part having at least a channel command code, a data length and a data address, and an I/O command part having at least and I/O command code and a data length, and each device control block including a device control word address, a channel status and a remaining byte count;
   an I/O device;
   an I/O controller directly connected to said I/O device for controlling same, said I/O controller including means for decoding the I/O command part and for making a data transfer request according to the I/O command part; and
   a channel unit, operatively connected to said central processing unit, said main storage unit and said I/O controller, including
     at least one device control register for holding, channel status bytes, an address of the at least one device control block and the device control word read out from said main storage unit;
     means for transferring the I/O command part of the device control word from said main storage to said I/O controller and updated channel status bytes in said device control register to the at least one device control block;
     means for preparing, simultaneously with the decoding by said I/O controller, a data transfer between said channel unit and said main storage unit according to the channel command part of the device control word and for updating the channel status bytes in said device control register; and
     means for carrying out the data transfer between said channel unit and said main storage unit in response to the data transfer request from said I/O controller.

2. A data processing system as recited in claim 1, further comprising a different type of I/O controller operatively connected to said channel unit and a different type of I/O device, operatively connected to said different type of I/O controller, and
   wherein the at least one device control word includes a first device control word corresponding to said I/O device and a second device control word corresponding to the different type of I/O device stored in said main storage unit and having channel command parts with the same command format and I/O command parts with different command formats.

3. A data processing system as recited in claim 2, wherein the channel command part and the I/O command part of each device control word are sent to the corresponding channel unit together.

4. A channel control system for a data processing system including a main storage unit and at least one I/O controller connected to at least one I/O device, for decoding I/O commands used to directly control the I/O device, the main storage unit storing at least one device control word at least one and a device control block, including a device control word address, a channel status and a remaining byte count, the I/O controller generating a data transfer request for the main storage in dependence upon the I/O command part of the device control word corresponding thereto, said channel control system comprising:
   at least one device control register, operatively connected to said main storage unit, for receiving and storing the device control word address and the device control word from said main storage unit and for storing updates to the channel status of the device control block having the device control word address.
   means, operatively connected to the device control register, for transferring the I/O command part of the device control word to the I/O controller;
   means, operatively connected to the device control register, for preparing, concurrently with decoding of the I/O command part by the I/O controller, a data transfer between said channel control system and the main storage unit in dependence upon the channel command part of the device control word; and
   means for performing the data transfer between said channel control system and the main storage unit in dependence upon the data transfer request from the I/O controller, for initiating a request sense command automatically when the I/O command part produces an error status, for generating the channel status from sense information obtained in response to the request sense command and for transferring from the device control register to the main storage unit, the updates of the status to the device control block having the device control word address.

5. A method for controlling a channel unit in a data processing system including a main storage unit and at least one I/O controller connected to at least one I/O device for decoding I/O commands used to directly control the I/O device, the main storage unit storing at least one device control word and at least one device control block, each the device control block having a corresponding I/O controller, a device control word address, a channel status and a remaining byte count, said method comprising the steps of:
  (a) storing, in the channel unit, the device control word address and the device control word from the main storage unit, the remaining byte count and updates to the channel status of the device control block having the device control block address, the device control word including a channel command part and an I/O command part;
  (b) transferring the I/O command part of the device control word to the I/O controller;
  (c) preparing, concurrently with decoding of the I/O command part by the I/O controller, a data transfer between the channel unit and the main storage unit in dependence upon the channel command part of the device control word;
  (d) performing the data transfer between the channel unit and the main storage unit in response to a data transfer request from the I/O controller;
  (e) initiating a request sense command automatically when the I/O part produces an error status;
  (f) generating the updatas to the channel status from sense information obtained in response to the request sense command; and
  (g) storing in the device control block having the device control word address in the main storage unit, the remaining byte count and the updates to the channel status updated in step (f).

6. A method as recited in claim 5,
  wherein the channel command part includes at least a channel command code, a data length and a data address and the I/O command part includes at least an I/O command code and the data length, and
  wherein step (c) comprises storing the data length in a byte length register.

* * * * *